US006901461B2

United States Patent
Bennett

(10) Patent No.: US 6,901,461 B2
(45) Date of Patent: May 31, 2005

(54) HARDWARE ASSISTED ATA COMMAND QUEUING

(75) Inventor: Joseph A. Bennett, Roseville, CA (US)

(73) Assignee: Intel Corporation, Santa Clara, CA (US)

(*) Notice: Subject to any disclaimer, the term of this patent is extended or adjusted under 35 U.S.C. 154(b) by 69 days.

(21) Appl. No.: 10/334,840

(22) Filed: Dec. 31, 2002

(65) Prior Publication Data

US 2004/0128408 A1 Jul. 1, 2004

(51) Int. Cl.$^7$ ............................................... G06F 13/14
(52) U.S. Cl. ........................... 710/22; 710/71; 710/106; 710/305
(58) Field of Search ............................ 710/22, 71, 106, 710/305

(56) References Cited

U.S. PATENT DOCUMENTS

| | | | | |
|---|---|---|---|---|
| 5,968,143 A | * | 10/1999 | Chisholm et al. | 710/23 |
| 6,151,641 A | * | 11/2000 | Herbert | 710/22 |
| 6,170,042 B1 | * | 1/2001 | Gaertner et al. | 711/158 |
| 6,636,922 B1 | * | 10/2003 | Bastiani et al. | 710/305 |
| 6,651,113 B1 | * | 11/2003 | Grimsrud | 710/22 |

* cited by examiner

Primary Examiner—A. Elamin

(74) Attorney, Agent, or Firm—Blakely, Sokoloff, Taylor & Zafman LLP

(57) ABSTRACT

One embodiment involves having a processor writing disk drive command information for a number of data transactions to cacheable system memory. The processor then performs a single write transaction to a disk drive host controller. The disk drive host controller then causes a DMA transfer to occur which reads the command information located in system memory and stores the command information in a queue. Once the host controller has the command information, it programs the disk drive with information corresponding to a queue entry over a serial interconnect. The disk drive signals an interrupt after it processes the command information. The disk drive host controller does not forward the interrupt to the processor, but services the interrupt itself. The disk drive host controller reads from the disk drive to determine the disk drive status. The disk drive can signal that it is ready to execute the programmed command, or it can signal that it is not ready to perform the programmed command but is ready to receive additional command programming information corresponding to another queue entry, or it may signal that it is ready to execute a previously programmed command. The disk drive host controller then performs the required operations using the information stored in the queue without involving the processor. Because the processor is only involved in setting up a command block in system memory and in signaling the disk drive host controller that the command block is ready for reading, the processor is freed up to perform other tasks and overall system performance is improved.

24 Claims, 2 Drawing Sheets

HARDWARE ASSISTED ATA COMMAND QUEUING

FIELD OF THE INVENTION

The present invention pertains to the field of computer systems. More particularly, this invention pertains to the field of programming mass storage devices.

BACKGROUND OF THE INVENTION

Typical computer systems utilize disk drives for mass storage. A disk drive is usually coupled to a host controller that resides in a system logic device. The disk drive is coupled to the host controller via an interconnect. One such interconnect is an AT Attachment (ATA) interconnect. The host controller communicates with the disk drive over the ATA interconnect.

In prior computer systems, in order to program a disk drive to initiate a data transfer, a processor must perform a series of one byte write cycles (anywhere between 8 and 16) to the ATA interface. This programming operation can take a significant amount of time and keep the processor from performing other tasks.

One method for improving ATA device performance is command queuing. This prior type of queuing is software based. With this method, a processor programs a storage device with command information for a data transfer. The storage device then signals an interrupt when done processing the command. The processor, responding to the interrupt, then reads from the storage device to determine the status of the storage device and to know if the command has been processed. The storage device may indicate that it is ready to execute the programmed command, or it may indicate that it is not ready to execute the programmed command but it is ready to accept programming for an additional command, or the storage device may indicate that it is ready to execute a previously programmed command.

The processor is involved in delivering command programming information to the storage device, servicing the interrupts signaled by the storage device, and managing a command queue in system memory. These tasks take up a significant amount of processor time and overall system performance is negatively affected.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

In general, one embodiment involves having a processor write disk drive command information for a number of data transactions to cacheable system memory. The processor then performs a single write transaction to a disk drive host controller. The disk drive host controller then causes a DMA transfer to occur which reads the command information located in system memory and stores the command information in a queue. Once the host controller has the command information, it programs the disk drive over a serial interconnect. The disk drive signals an interrupt after it processes the command information. The disk drive host controller does not forward the interrupt to the processor, but services the interrupt itself. The disk drive host controller reads from the disk drive to determine the disk drive status. The disk drive can signal that it is ready to execute the programmed command, or it can signal that it is not ready to perform the programmed command but is ready to receive additional command programming information corresponding to another queue entry, or it may signal that it is ready to execute a previously programmed command. The disk drive host controller then performs the required operations using the information stored in the queue without involving the processor. Because the processor is only involved in setting up a command block in system memory and in signaling the disk drive host controller that the command block is ready for reading, the processor is freed up to perform other tasks and overall system performance is improved.

Figure 1:
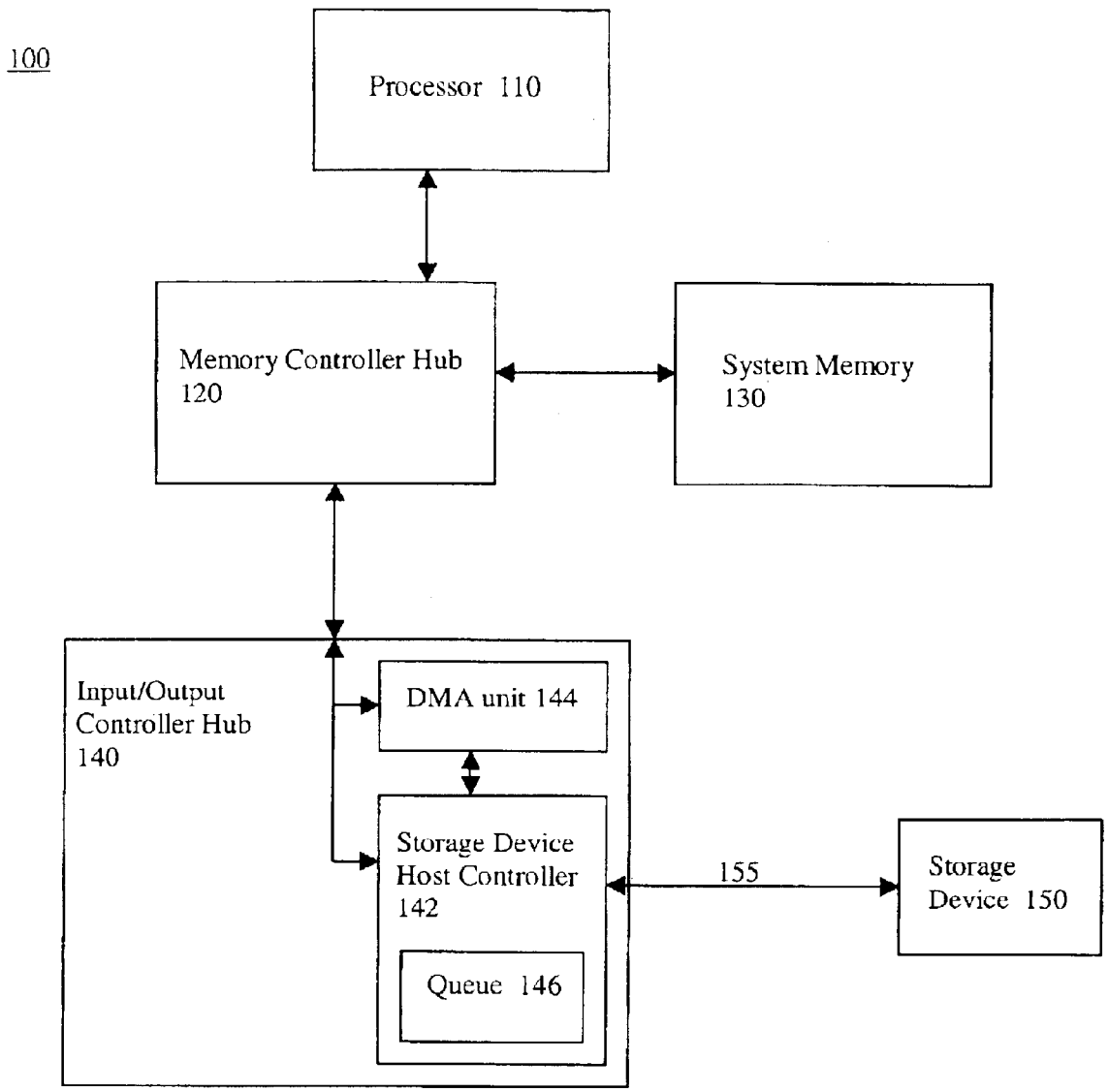
FIG. 1 is a block diagram of a computer system including an input/output controller hub that includes a direct memory access (DMA) unit and a storage device host controller including a queue.

FIG. 1 is a block diagram of a computer system 100 including an input/output controller hub 140 that includes a direct memory access (DMA) unit 144 and a storage device host controller 142. The storage device host controller includes a queue 146. The queue 146 may be a type of ring buffer (as will be discussed below the ring buffer entries may be processed out-of-order). The queue 146 in this example embodiment includes 32 entries containing 16 bytes of information each. Other embodiments are possible using other sizes and formats of queues. The system 100 further includes a processor 110, a memory controller hub 120, and a system memory 130. The processor 110 communicates with the input/output hub 140 or the system memory 130 through the memory controller hub 120. One embodiment may include a processor from the family of Pentium® processors from Intel® Corporation. Other embodiments may use other types of processors or micro-controllers.

The system 100 also includes a storage device 150 coupled to the storage device host controller 142 via an interconnect 155. For this embodiment, the interconnect 155 is a serial ATA interconnect, although other embodiments are possible using other types of interconnects. The storage device 150 in this example embodiment is a disk drive.

The configuration of the system 100 is only one of a wide variety of configurations possible.

In the current example embodiment, when the storage device 150 needs to be programmed in order to initiate a data transfer, the processor 110 writes a command block to the system memory 130. The command block includes information necessary for the storage device 150 to perform a number of data transfers. For this example embodiment, the command block includes 32 entries of command information, each entry being 16 bytes in length. Other embodiments are possible using other sizes and formats of command blocks. Also for this embodiment, the command block is stored in cacheable memory space.

Following the write of the command block to system memory 130, the processor 110 performs a single write cycle to the storage device host controller 142. The write may be to a register within the host controller 142 or to a register located elsewhere within the input/output controller hub 140. The write cycle from the processor 110 informs the host controller 142 that a command block has been written to the system memory 130. The information conveyed by the write cycle may also include information regarding the location of the command block in system memory.

In response to the write cycle from the processor 110, the host controller 142 causes a DMA transfer to occur to read the command block from the system memory 130. The DMA transfer may be performed by the DMA unit 144. The DMA read may occur in a burst fashion. The retrieved command block is stored in the queue 146 within the host controller 142.

Each of the queue entries has a tag and a valid bit associated with it. Once the command associated with a particular queue entry has been executed, the valid bit associated with that queue entry is cleared, indicating a "done" state.

Once the command block is retrieved from the system memory 130, the host controller 142 delivers the command programming information corresponding to one of the queue entries to the storage device 150 over the interconnect 155. The host controller 142 may begin with the $0^{th}$ queue entry. Along with the command programming information, the host controller 142 indicates to the storage device that the transaction is of type "queued". The host controller 142 also delivers tag information indicating to the storage device to which queue entry the command programming information corresponds.

Once the storage device 150 processes the command information, it signals an interrupt to the host controller 142. The host controller 142 reads from the storage device 150 in order to determine the storage device status. The storage device 150 can either indicate that it is ready to execute the transaction associated with the $0^{th}$ queue entry or it may indicate that it is not ready to execute the transaction associated with the $0^{th}$ entry but is able to receive command programming information for an additional command.

If the storage device 150 indicates that it is ready to execute the transaction associated with the $0^{th}$ queue entry, the host controller 142 performs the transfer. The $0^{th}$ queue entry is marked "done" once the transaction is complete.

If the storage device 150 indicates that it is not ready to execute the transaction associated with the $0^{th}$ queue entry, but is ready to receive additional command programming information, then the host controller 142 will deliver command programming information corresponding to the $1^{st}$ queue entry to the storage device 150.

Many storage devices have the ability to store command programming information for several transactions at a time. These storage devices may try to make intelligent decisions regarding in what order to perform the various transactions. Therefore, it is possible that the storage device may desire to execute transactions in a different order than the order in which the command programming information for these transactions was received.

For example, after the host controller 142 has delivered the command programming information corresponding to the $1^{st}$ queue entry to the storage device 150, the storage device 150 may signal an interrupt to the host controller 142. When the host controller 142 checks the storage device status, the storage device 150 may indicate that it is not ready to execute the transactions associated with the $1^{st}$ queue entry, but is ready to receive additional command programming information. The host controller will then deliver command programming information corresponding to the $2^{nd}$ queue entry to the storage device 150. When the host controller 142 next checks the status of the storage device in response to an interrupt from the storage device 150, the storage device may indicate that it is ready to execute the transaction associated with the $1^{st}$ queue entry. The storage device indicates which transaction is wishes to execute by communicating the tag for the corresponding queue entry. The host controller 142 can then perform the prescribed transaction, after which the $1^{st}$ queue entry is marked "done". The host controller then can then deliver command programming information corresponding to the $3^{rd}$ queue entry, and the storage device can then indicate whether it wants to execute the transaction associated with the $0^{th}$, $2^{nd}$, or $3^{rd}$ queue entry, or whether it is not ready to execute and of the transactions but is ready for additional command programming information.

Figure 2:
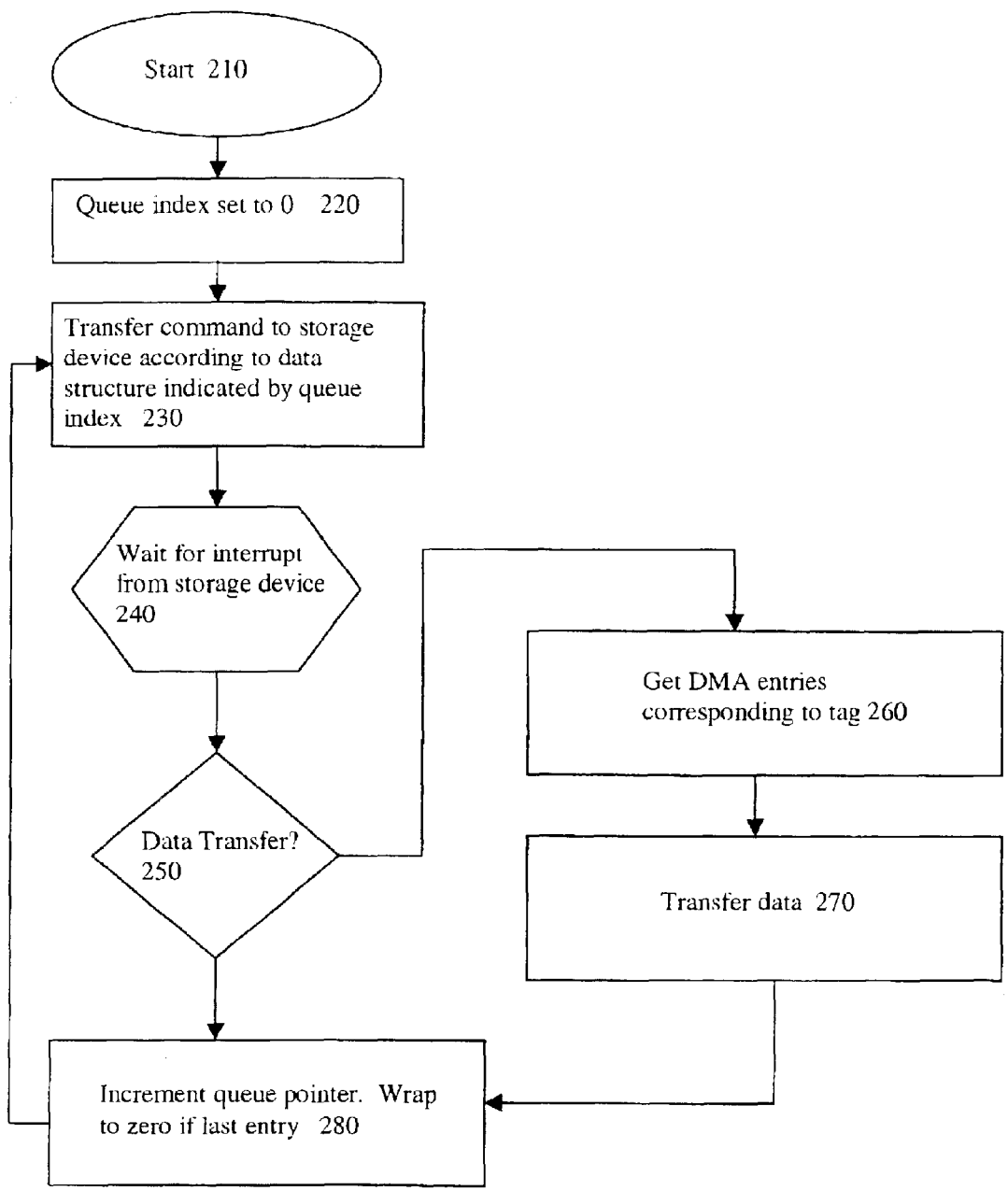
FIG. 2 is a flow diagram of a method for hardware assisted storage device command queuing.

The interactions among the various system components may be further clarified by looking at FIG. 2. The process described in connection with FIG. 2 may be implemented at least in part as a state machine within a storage device host controller. The process described in FIG. 2 begins at block 210. At this point, a command block has already been transferred by way of a direct memory access transaction to a queue within a storage device host controller. At block 220 the queue index is set to 0. A command (command programming information) is transferred to a storage device at block 230. The transferred command corresponds to the data structure (queue entry) indicated by the queue index. Block 240 indicates that when an interrupt is received from the storage device at the host controller, the process proceeds to block 250. At block 250, a decision must be made as to whether the storage device wishes to execute a data transfer. The host controller checks the status of the storage device via a read transaction.

If the storage device is ready to execute a data transfer, then at block 260 the transaction information stored in the queue entry corresponding to a tag value delivered by the storage device is determined. The queue entry may include information necessary to perform a DMA transaction. In this iteration of the process, the only command stored in the storage device is the command corresponding to the $0^{th}$ queue entry. During future iterations of the process, the storage device may return any of a number of tag values as the storage device may store a number of commands at a time. The data transfer occurs at block 270.

If the storage device is not ready to perform a data transfer, then the process proceeds immediately to block 280. Whether there is a data transfer or not, the queue pointer is incremented at block 280. If on the last queue entry, then the queue pointer is wrapped to zero. The process then returns to block 230 where command programming information from the queue entry corresponding to the new queue index is transferred to the storage device.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than in a restrictive sense.

Reference in the specification to "an embodiment," "one embodiment," "some embodiments," or "other embodiments " means that a particular feature, structure, or characteristic described in connection with the embodiments is included in at least some embodiments, but not necessarily all embodiments, of the invention. The various appearances of "an embodiment," "one embodiment," or "some embodiments" are not necessarily all referring to the same embodiments.

What is claimed is:

1. An apparatus, comprising:
a storage device host controller to provide communication with a storage device over a serial interconnect;
a queue to store a plurality of storage device command programming entries;
a direct memory access unit coupled to the storage device host controller and the queue, where the storage device host controller uses the direct memory access unit to read from a system memory to retrieve information to be stored in the queue;
and further wherein the storage device host controller is operable to deliver programming information to the storage device that corresponds to a first one of the plurality of storage device command programming entries, wherein each of the plurality of storage device command programming entries includes an indication as to whether the entry is valid.

2. The apparatus of claim 1, the storage device host controller to receive an indication from the storage device that the storage device is ready to perform a data transfer corresponding to the first one of the plurality of storage device command programming entries.

3. The apparatus of claim 2, wherein the indication from the storage device that the storage device is ready to perform a data transfer includes the storage device host controller receiving an interrupt from the storage device and the storage device host controller performing a read transaction from the storage device to determine that the storage device is ready to perform a data transfer, the read transaction from the storage device to retrieve information indicating which of the plurality of storage device command programming entries is to be used to perform the data transfer.

4. The apparatus of claim 3, the storage device host controller to perform a data transfer corresponding to the first one of the plurality of storage device command programming entries using the direct memory access unit.

5. The apparatus of claim 1, the storage device host controller to receive an indication from the storage device that the storage device is not ready to perform a data transfer corresponding to the first one of the plurality of storage device command programming entries, but is ready to receive command programming information corresponding to a second one of the plurality of storage device command entries.

6. The apparatus of claim 5, wherein the indication from the storage device that the storage device is not ready to perform a data transfer includes the storage device host controller receiving an interrupt from the storage device and the storage device host controller performing a read transaction from the storage device to determine that the storage device is not ready to perform a data transfer corresponding to the first one of the plurality of storage device command programming entries but is ready to receive command programming information corresponding to a second one of the plurality of storage device command entries.

7. The apparatus of claim 1, the storage device host controller to receive an indication from the storage device that the storage device is ready to perform a data transfer corresponding to a third one of the plurality of storage device command programming entries.

8. The apparatus of claim 7, wherein the indication from the storage device that the storage device is ready to perform a data transfer includes the storage device host controller receiving an interrupt from the storage device and the storage device host controller performing a read transaction from the storage device to determine that the storage device is ready to perform a data transfer, the read transaction from the storage device to retrieve information indicating which of the plurality of storage device command programming entries is to be used to perform the data transfer.

9. The apparatus of claim 8, the storage device host controller to perform a data transfer corresponding to the third one of the plurality of storage device command programming entries using the direct memory access unit.

10. A method, comprising:
storing a plurality of storage device command programming entries in a queue within a storage device host controller, wherein storing the plurality of storage device command programming entries in the queue includes performing a direct memory access transaction to retrieve command programming entry information from a system memory and storing the retrieve command programming entry information in the queue;
delivering command programming information corresponding to a first one of the plurality or storage device command programming entries to a storage device;
receiving an interrupt at the storage device host controller from a storage device;
the storage device host controller performing a read transaction from the storage device to determine that the storage device is not ready to perform a data transaction corresponding to the first one of the plurality of storage device command programming entries but is ready to receive command programming information corresponding to a second one of the plurality of storage device command programming entries.

11. The method of claim 10, further comprising the storage device host controller performing a read transaction from the storage device to determine that the storage device is ready to perform a data transaction corresponding to the first one of the plurality of storage device command programming entries.

12. The method of claim 11, further comprising the storage device host controller performing the data transaction corresponding to the first one of the plurality of storage device command programming entries using a direct memory access transaction.

13. The method of claim 10, further comprising the storage device host controller delivering command programming information corresponding to the second one of the plurality of storage device command programming entries to the storage device.

14. The method of claim 10, further comprising the storage device host controller performing a read transaction from the storage device to determine that the storage device is ready to perform a data transaction corresponding to a third one of the plurality of storage device command programming entries.

15. The method of claim 14, further comprising the storage device host controller performing the data transaction corresponding to the third one of the plurality of storage device command programming entries using a direct memory access transaction.

16. A system, comprising:
a processor;
a memory controller hub coupled to the processor;
a system memory coupled to the memory controller hub;
a storage device; and
an input/output controller hub including
a storage device host controller to provide communication with the storage device over a serial interconnect and to deliver programming information to the storage device that corresponds to a first one of the plurality of storage device command programming entries, each of the plurality of storage device command programming entries including an indication as to whether the entry is valid, and a direct memory access unit coupled to the storage device host controller and the queue, wherein the storage device host controller uses the direct memory access unit to read from the system memory to retrieve information to be stored in the queue;

a queue to store a plurality of storage device command programming entries.

17. The system of claim 16, the storage device host controller to receive an indication from the storage device that the storage device is ready to perform a data transfer corresponding to the first one of the plurality of storage device command programming entries.

18. The system of claim 17, wherein the indication from the storage device that the storage device is ready to perform a data transfer includes the storage device host controller receiving an interrupt from the storage device and the storage device host controller performing a read transaction from the storage device to determine that the storage device is ready to perform a data transfer, the read transaction from the storage device to retrieve information indicating which of the plurality of storage device command programming entries is to be used to perform the data transfer.

19. The system of claim 18, the storage device host controller to perform a data transfer corresponding to the first one of the plurality of storage device command programming entries using the direct memory access unit.

20. The system of claim 16, the storage device host controller to receive an indication from the storage device that the storage device is not ready to perform a data transfer corresponding to the first one of the plurality of storage device command programming entries, but is ready to receive command programming information corresponding to a second one of the plurality of storage device command entries.

21. The system of claim 18, wherein the indication from the storage device that the storage device is not ready to perform a data transfer includes the storage device host controller receiving an interrupt from the storage device and the storage device host controller performing a read transaction from the storage device to determine that the storage device is not ready-to perform a data transfer corresponding to the first one of the plurality of storage device command programming entries but is ready to receive command programming information corresponding to a second one of the plurality of storage device command entries.

22. The apparatus of claim 16, the storage device host controller to receive an indication from the storage device that the storage device is ready to perform a data transfer corresponding to a third one of the plurality of storage device command programming entries.

23. The system of claim 22, wherein the indication from the storage device that the storage device is ready to perform a data transfer includes the storage device host controller receiving an interrupt from the storage device and the storage device host controller performing a read transaction from the storage device to determine that the storage device is ready to perform a data transfer, the read transaction from the storage device to retrieve information indicating which of the plurality of storage device command programming entries is to be used to perform the data transfer.

24. The system of claim 23, the storage device host controller to perform a data transfer corresponding to the third one of the plurality of storage device command programming entries using the direct memory access unit.

* * * * *